US009880451B2

(12) United States Patent
Clearman

(10) Patent No.: US 9,880,451 B2
(45) Date of Patent: *Jan. 30, 2018

(54) QUICK-RELEASE BALL-AND-SOCKET JOINT CAMERA MOUNT

(71) Applicant: GoPro, Inc., San Mateo, CA (US)

(72) Inventor: Christopher Aaron Clearman, Half Moon Bay, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/582,356

(22) Filed: Apr. 28, 2017

(65) Prior Publication Data

US 2017/0235213 A1    Aug. 17, 2017

Related U.S. Application Data

(63) Continuation of application No. 14/521,458, filed on Oct. 22, 2014, now Pat. No. 9,661,197.

(51) Int. Cl.
| | | |
|---|---|---|
| *G01N 33/02* | (2006.01) | |
| *G03B 17/56* | (2006.01) | |
| *G03B 17/02* | (2006.01) | |
| *F16M 11/14* | (2006.01) | |
| *F16M 11/04* | (2006.01) | |
| *F16M 11/22* | (2006.01) | |

(52) U.S. Cl.
CPC ......... *G03B 17/561* (2013.01); *F16M 11/041* (2013.01); *F16M 11/14* (2013.01); *F16M 11/22* (2013.01); *G03B 17/02* (2013.01); *F16M 2200/022* (2013.01); *F16M 2200/08* (2013.01)

(58) Field of Classification Search
CPC ...................................................... G01N 33/02
See application file for complete search history.

(56) References Cited

U.S. PATENT DOCUMENTS

| | | |
|---|---|---|
| 2,962,251 A | 11/1960 | Karpf |
| 8,014,656 B2 | 9/2011 | Woodman |
| 8,267,361 B1 * | 9/2012 | Dordick ................. F16M 11/14 248/178.1 |

(Continued)

FOREIGN PATENT DOCUMENTS

WO    WO 2005/098304    10/2005

OTHER PUBLICATIONS

PCT International Search Report and Written Opinion for PCT/US15/45403, dated Nov. 19, 2015, 12 Pages.

(Continued)

*Primary Examiner* — Clayton E Laballe
*Assistant Examiner* — Dennis Hancock
(74) *Attorney, Agent, or Firm* — Fenwick & West LLP

(57) ABSTRACT

A camera mounting system has an upper mount component, a lower mount component, and a base mount component. The upper mount component secures the camera and has a ball protrusion that reciprocally couples with a socket of the lower mount component. The upper mount component can rotate 360 degrees relative to the lower mount, and can pivot 90 degrees or more relative to the lower mount component. The lower mount component couples with the base mount component in a plurality of orientations. This camera mounting system allows for a large range of motion for the camera relative to the mounting system.

20 Claims, 18 Drawing Sheets

(56) References Cited

U.S. PATENT DOCUMENTS

| | | | |
|---|---|---|---|
| 2001/0017339 A1 | 8/2001 | Brotz et al. | |
| 2005/0025472 A1* | 2/2005 | Sugita | G03B 17/565 396/71 |
| 2005/0122424 A1 | 6/2005 | Overstreet | |
| 2008/0011344 A1 | 1/2008 | Barker | |
| 2008/0023607 A1* | 1/2008 | Barker | F16M 11/08 248/288.51 |
| 2008/0267613 A1 | 10/2008 | Darrow | |
| 2011/0224798 A1 | 9/2011 | Caillouette et al. | |
| 2012/0070223 A1 | 3/2012 | Wimberley | |
| 2012/0288269 A1* | 11/2012 | Jensen | F16M 11/14 396/428 |
| 2014/0099093 A1 | 4/2014 | Johnson et al. | |
| 2016/0100083 A1 | 4/2016 | Harrison | |

OTHER PUBLICATIONS

United States Advisory Action, U.S. Appl. No. 14/521,458, dated Aug. 12, 2016, two pages.
United States Advisory Action, U.S. Appl. No. 14/521,458, dated Jun. 20, 2016, four pages.
United States Office Action, U.S. Appl. No. 14/521,458, dated Sep. 20, 2016, 16 pages.
United States Office Action, U.S. Appl. No. 14/521,458, dated Feb. 25, 2016, 13 pages.
United States Office Action, U.S. Appl. No. 14/521,458, dated Jul. 28, 2015, 12 pages.

* cited by examiner

QUICK-RELEASE BALL-AND-SOCKET JOINT CAMERA MOUNT

CROSS REFERENCE TO RELATED APPLICATIONS

This application is a continuation of U.S. application Ser. No. 14/521,458, filed Oct. 22, 2014, now issued as U.S. Pat. No. 9,661,197, which is incorporated by reference in its entirety.

BACKGROUND

Technical Field

This disclosure relates to a camera mounting system, and more specifically, to a ball-and-socket joint camera mounting system.

Description of the Related Art

Digital cameras are increasingly used in outdoors and sports environments. In order to secure cameras to sports equipment (such as sports boards, helmets, vehicles, and the like), cameras can be coupled to mounts that are mounted on the sports equipment. Conventional mounting systems can be limited in the directions and orientations in which a camera can be configured, limiting the utility and flexibility of the camera, and potentially decreasing a user's satisfaction with the camera and mounting system.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Camera System Configuration

A camera system can include a camera and a camera housing structured to at least partially enclose the camera. The camera can include a camera body having a camera lens structured on a front surface of the camera body, various indicators on the front of the surface of the camera body (such as LEDs, displays, and the like), various input mechanisms (such as buttons, switches, and touch-screen mechanisms), and electronics (e.g., imaging electronics, power electronics, etc.) internal to the camera body for capturing images via the camera lens and/or performing other functions. The camera housing can include a lens window structured on the front surface of the camera housing and configured to substantially align with the camera lens, and one or more indicator windows structured on the front surface of the camera housing and configured to substantially align with the camera indicators.

Figure 1A:
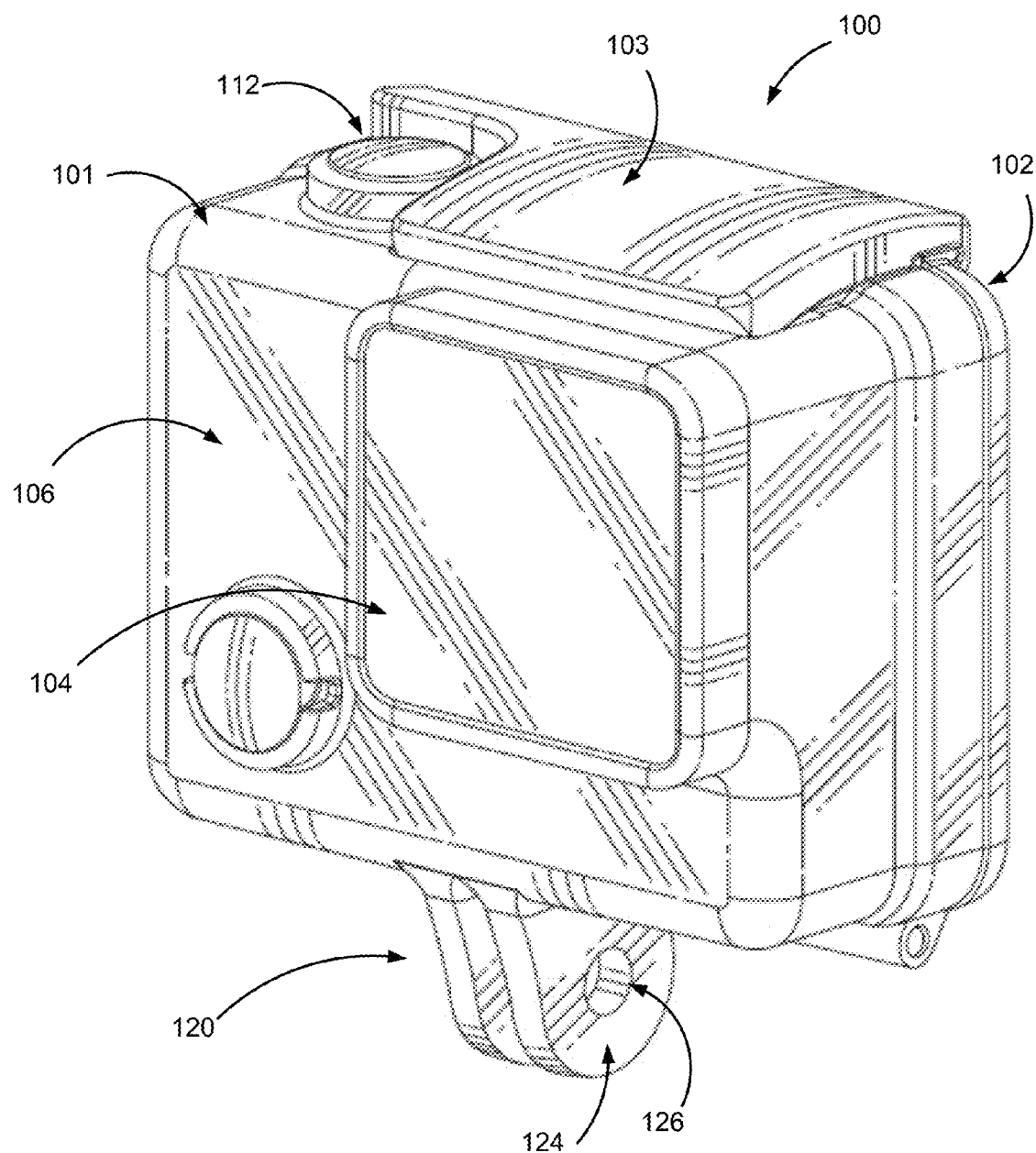
FIG. 1a illustrates a perspective view of a camera system, according to one embodiment.
Figure 1B:
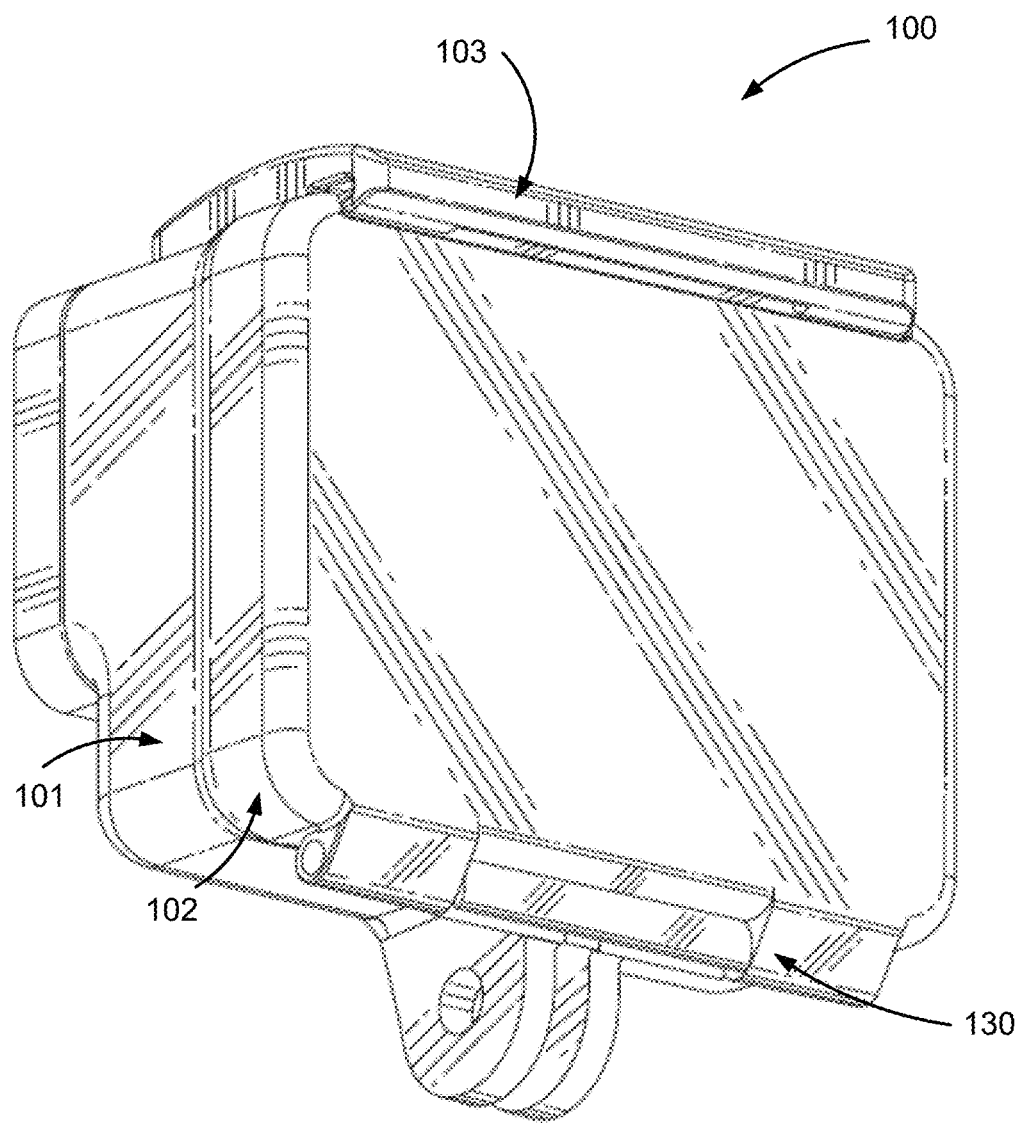
FIG. 1b illustrates a perspective view of a rear of the camera system, according to one embodiment.

FIGS. 1a and 1b illustrate various views of a camera system according to one example embodiment. The camera system includes, among other components, a camera housing 100. In one embodiment, a first housing portion 101 includes a front face with four sides (i.e., a top side, bottom side, left side, and right side) structured to form a cavity that receives a camera (e.g. a still camera or video camera), and a second housing portion 102 structured to couple to the first housing portion 101 and securely enclose a camera within the camera housing 100. The first housing portion 101 and second housing portion 102 can be pivotally coupled via a hinge mechanism (described in greater detail in FIG. 1b), and can securely couple via a latch mechanism 103. In some embodiments, the camera housing 100 may not include one or more sides or faces. For instance, the camera housing 100 may not include a front or back face, allowing the front face and rear face of the camera to be exposed when partially enclosed by the top side, bottom side, left side, and right side of the camera housing 100.

In one embodiment, the camera housing 100 has a small form factor (e.g., a height of approximately 4 to 6 centimeters, a width of approximately 5 to 7 centimeters, and a depth of approximately 1 to 4 centimeters), and is lightweight (e.g., approximately 50 to 150 grams). The camera housing 100 can be rigid (or substantially rigid) (e.g., plastic, metal, fiberglass, etc.) or pliable (or substantially pliable) (e.g., leather, vinyl, neoprene, etc.). In one embodiment, the camera housing 100 may be appropriately configured for use in various elements. For example, the camera housing 100 may comprise a waterproof enclosure that protects a camera from water when used, for example, while surfing or scuba diving.

Portions of the camera housing 100 may include exposed areas to allow a user to manipulate buttons on the camera that are associated with the camera functionality. Alternatively, such areas may be covered with a pliable material to allow the user to manipulate the buttons through the camera housing 100. For example, in one embodiment the top face of the camera housing 100 includes an outer shutter button 112 structured so that a shutter button of the camera is substantially aligned with the outer shutter button 112 when the camera is secured within the camera housing 100. The shutter button 112 of the camera is operationally coupled to the outer shutter button 112 so that pressing the outer shutter button 112 allows the user to operate the camera shutter button.

In one embodiment, the front face of the camera housing 100 includes a lens window 104 structured so that a lens of the camera is substantially aligned with the lens windows 104 when the camera is secured within the camera housing 100. The lens window 104 can be adapted for use with a conventional lens, a wide angle lens, a flat lens, or any other specialized camera lens.

In one embodiment, the camera housing 100 includes one or more securing structures 120 for securing the camera housing 100 to one of a variety of mounting devices such as a clip-style mount. In the embodiment of FIG. 1a, the camera housing 100 includes a plurality of protrusions 124, each including a hole 126 configured to receive a coupling mechanism, for instance, a turnable handscrew to pivotally couple the camera housing 100 to a mounting device including a plurality of reciprocal protrusions. In other embodiments, the camera housing 100 can be secured to a different type of mounting structure, and can be secured to a mounting structure via a different type of coupling mechanism.

In one embodiment, the camera housing 100 includes an indicator window 106 structured so that one or more camera indicators are substantially aligned with the indicator window 106 when the camera is secured within the camera housing 100. The indicator window 106 can be any shape or size, and can be made of the same material as the remainder of the camera housing 100, or can be made of any other material, for instance a transparent or translucent material and/or a non-reflective material.

The described housing 100 may also be adapted for a wider range of devices of varying shapes, sizes and dimensions besides cameras. For example, an expansion module may be attached to housing 100 to add expanded features to electronic devices such as cell phones, music players, personal digital assistants ("PDAs"), global positioning system ("GPS") units, or other portable electronic devices.

FIG. 1b is a rear perspective view of camera housing 100, according to one example embodiment. The second housing portion 102 detachably couples with the first housing portion 101 opposite the front face of the first housing portion 101. The first housing portion 101 and second housing portion 102 are collectively structured to enclose a camera within the cavity formed when the second housing portion 102 is securely coupled to the first housing portion 101 in a closed position.

In one embodiment, the second housing portion 102 pivots around a hinge mechanism 130, allowing the second housing portion 102 to be either in a closed position relative to the first housing portion 101 (for instance, when the second housing portion 102 is securely coupled to the first housing portion 101 via the latch mechanism 103), or in an open position (when the first housing portion 101 and the second housing portion 102 are not coupled via the latch mechanism 103). In the open position, a camera can be removed from or placed into the camera housing 100, and in the closed position, the camera can be securely enclosed within the camera housing 100. In one embodiment, the latch mechanism 103 includes a hook-shaped lateral bar configured to securely couple around a reciprocal structure of the second housing portion 102. In different embodiments, the latch mechanism 103 includes different fastening structures for securing the second housing portion 102 to the first housing portion 101, for example a button assembly, a buckle assembly, a clip assembly, a hook and loop assembly, a magnet assembly, a ball and catch assembly, and an adhesive assembly, or any other type of securing mechanism.

In one alternative embodiment, the hinge 130 is instead located on the top face of the housing 100, and the latch mechanism 103 is located on the bottom face of the housing 100. Alternatively, the hinge 130 and the latch mechanism 103 may be located on opposite side faces of the camera housing 100.

In one embodiment, the housing 100 includes a watertight seal so that the housing 100 is waterproof when the second housing portion 102 is in the closed position. For example, in one embodiment, the second housing portion 102 includes a sealing structure positioned on interior edges of the second housing portion 102. The sealing structure provides a watertight seal between the first housing portion 101 and the second housing portion when the latch mechanism securely couples the housing portions.

Figure 2A:
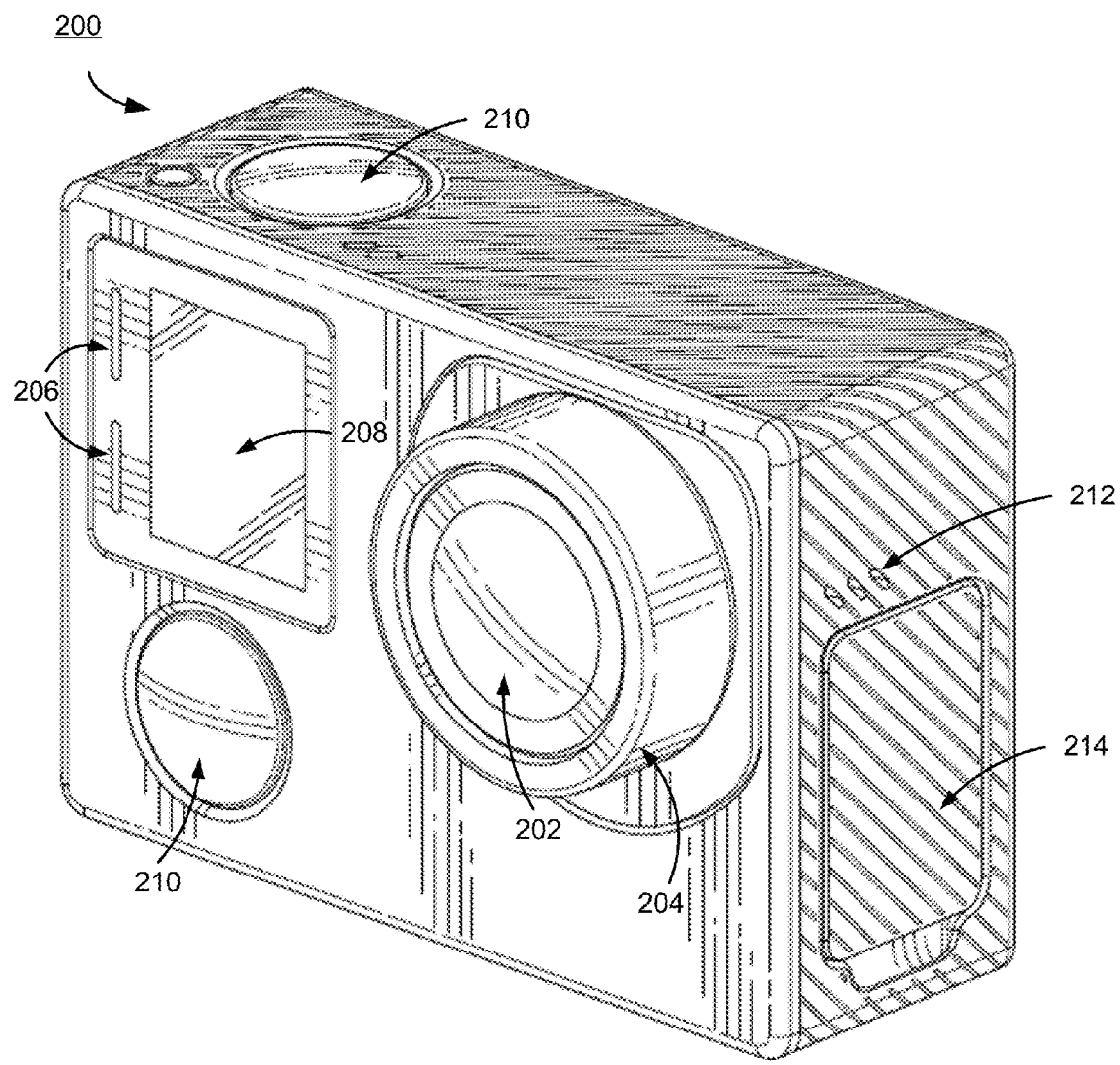
FIG. 2a illustrates a perspective view of a camera for use with the camera system, according to one embodiment.

FIG. 2a illustrates a camera 200 for use with the camera systems described herein, according to one example embodiment. The camera 200 is configured to capture images and video, and to store captured images and video for subsequent display or playback. The camera 200 is adapted to fit within a camera housing, such as the housing 100 discussed above or any other housing described herein. As illustrated, the camera 200 includes a lens 202 configured to receive light incident upon the lens and to direct received light onto an image sensor internal to the lens for capture by the image sensor. The lens 202 is enclosed by a lens ring 204.

The camera 200 can include various indicators, including the LED lights 206 and the LED display 208 shown in FIG. 2a. When the camera 200 is enclosed within the housing 100, the LED lights and the LED display 208 are configured to substantially align with the indicator window 106 and be visible through the housing 100. The camera 200 can also include buttons 210 configured to allow a user of the camera to interact with the camera, to turn the camera on, to initiate the capture of video or images, and to otherwise configure the operating mode of the camera. The camera 200 can also include one or more microphones 212 configured to receive and record audio signals in conjunction with recording video. In some embodiments, the camera 200 includes one or more sets of microphones, with each set of microphones including a first microphone and a second, dampened microphone, where the second dampened microphone is configured to capture audio at approximately 20 dB (or any other suitable magnitude) less than the first microphone. The side of the camera 200 includes an I/O interface 214. Though the embodiment of FIG. 2a illustrates the I/O interface 214 enclosed by a protective door, the I/O interface can include any type or number of I/O ports or mechanisms, such as USC ports, HDMI ports, memory card slots, and the like.

Figure 2B:
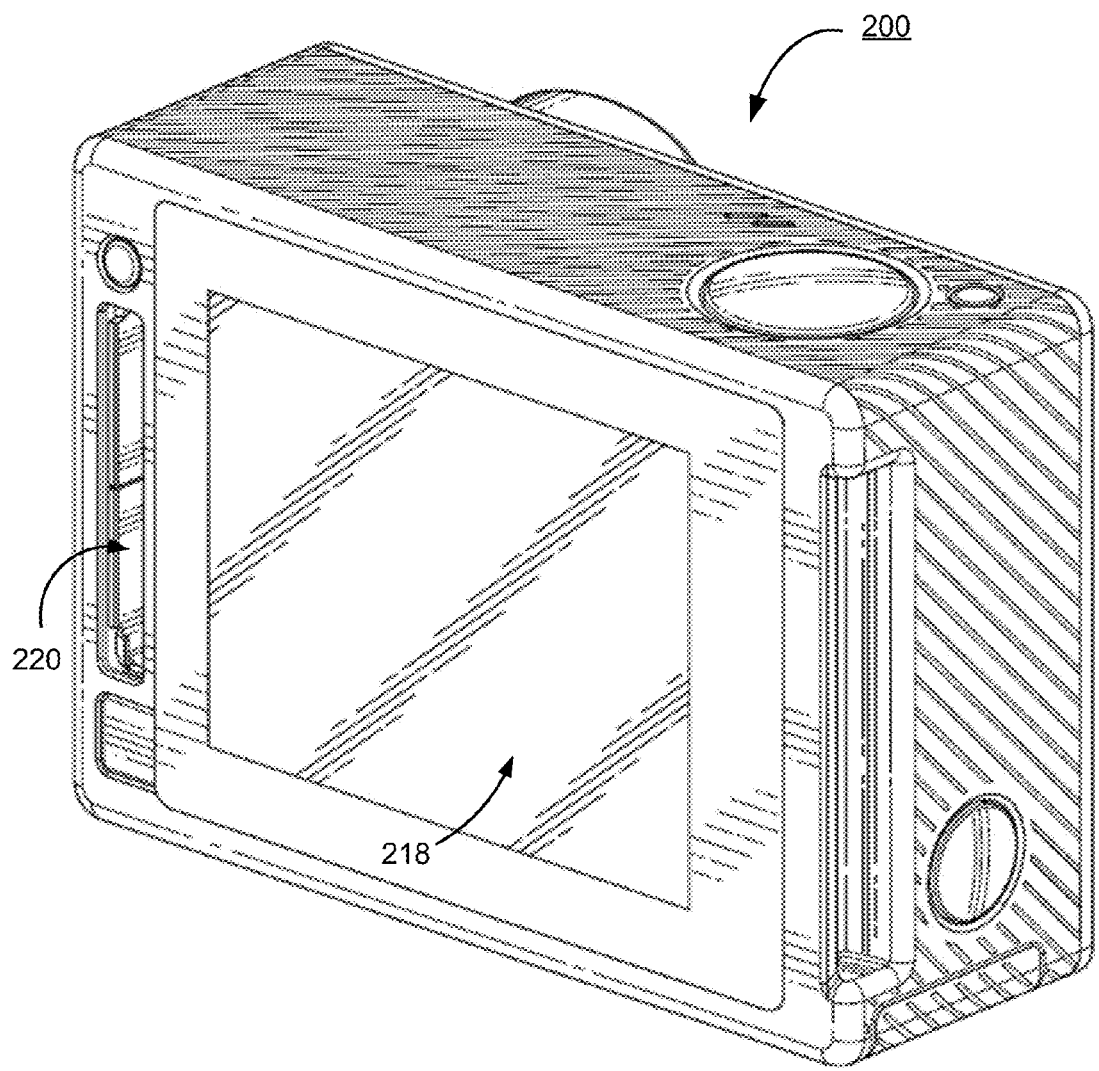
FIG. 2b illustrates a perspective view of a rear of a camera for use with the camera system, according to one embodiment.

FIG. 2b illustrates a perspective view of a rear of a camera 200 for use with the camera systems described herein, according to one embodiment. The camera 200 includes a display 218 (such as an LCD or LED display) on the rear surface of the camera 200. The display 218 can be configured for use, for example, as an electronic view finder, to preview captured images or videos, or to perform any other suitable function. The camera 200 also includes an expansion pack interface 220 configured to receive a removable expansion pack, such as an extra battery module, a wireless module, and the like. Removable expansion packs, when coupled to the camera 200, provide additional functionality to the camera via the expansion pack interface 220.

Example Camera Mount with Ball-and-Socket Joint

A camera mount can include a ball-and-socket joint that allows for a larger range of motion of one mount portion relative to another when compared to other camera mounts.

Figure 3A:
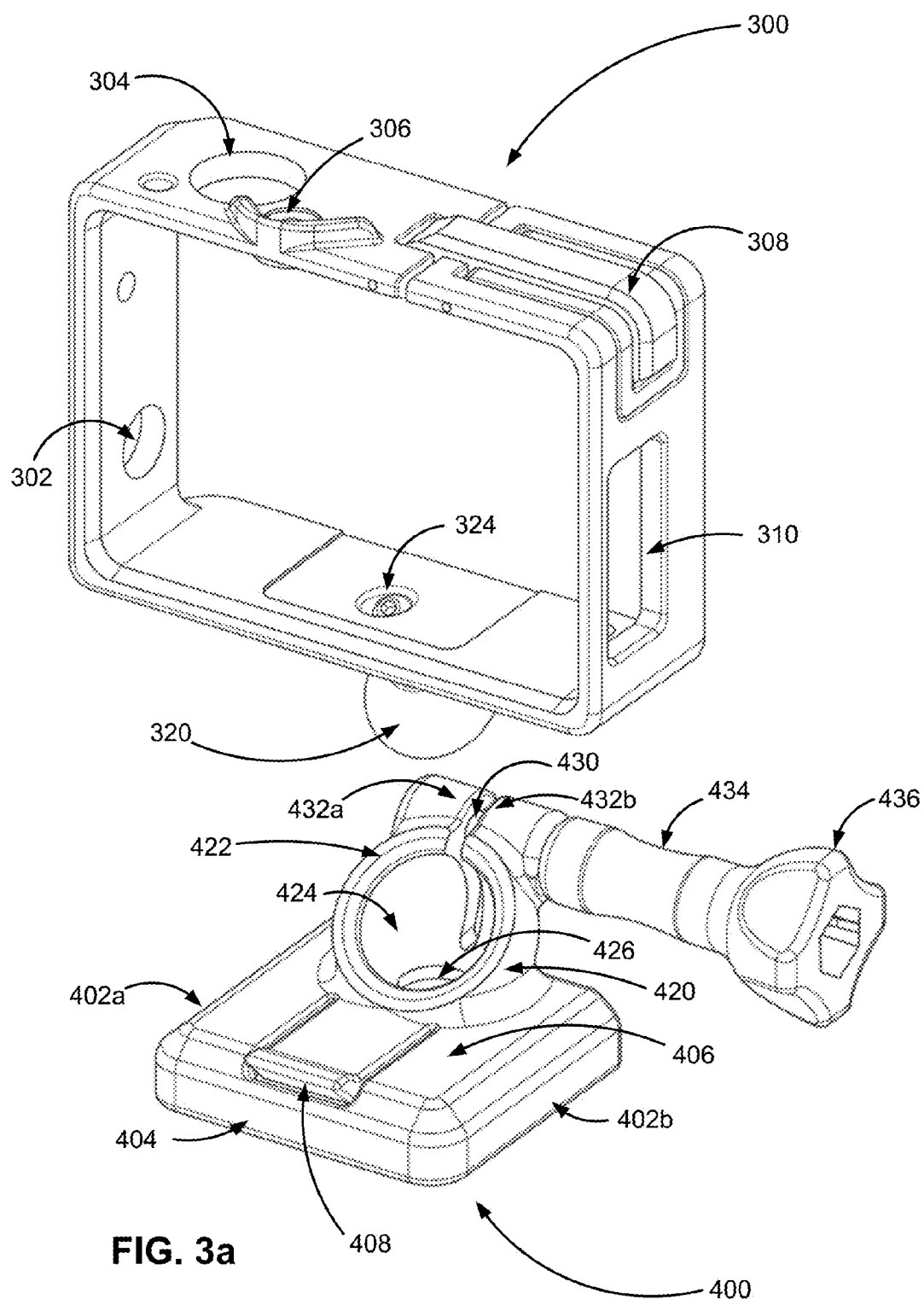
FIGS. 3a and 3b illustrate exploded views of a camera mount with a ball-and-socket joint, according to one embodiment.
Figure 3B:
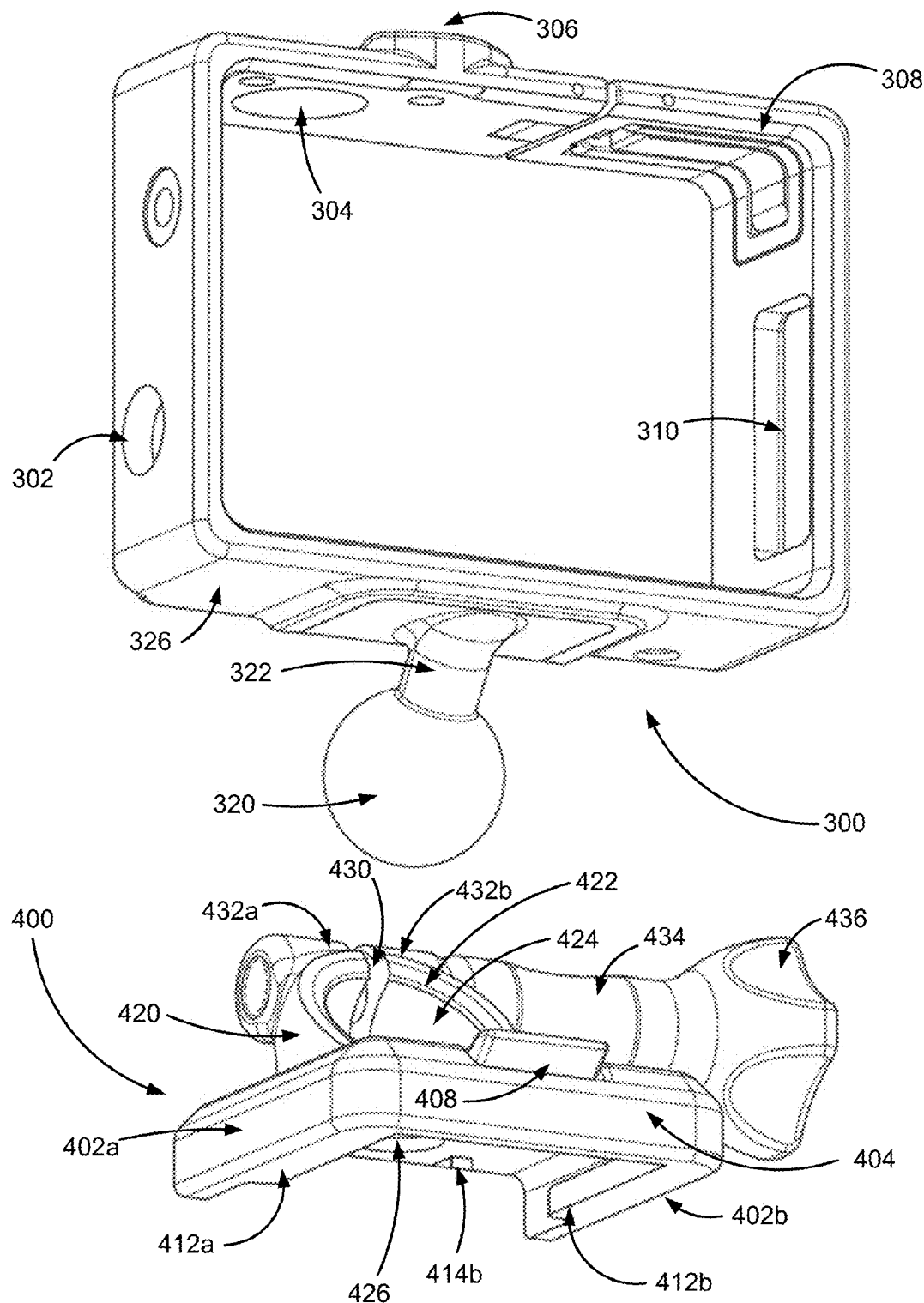
Figure 4A:
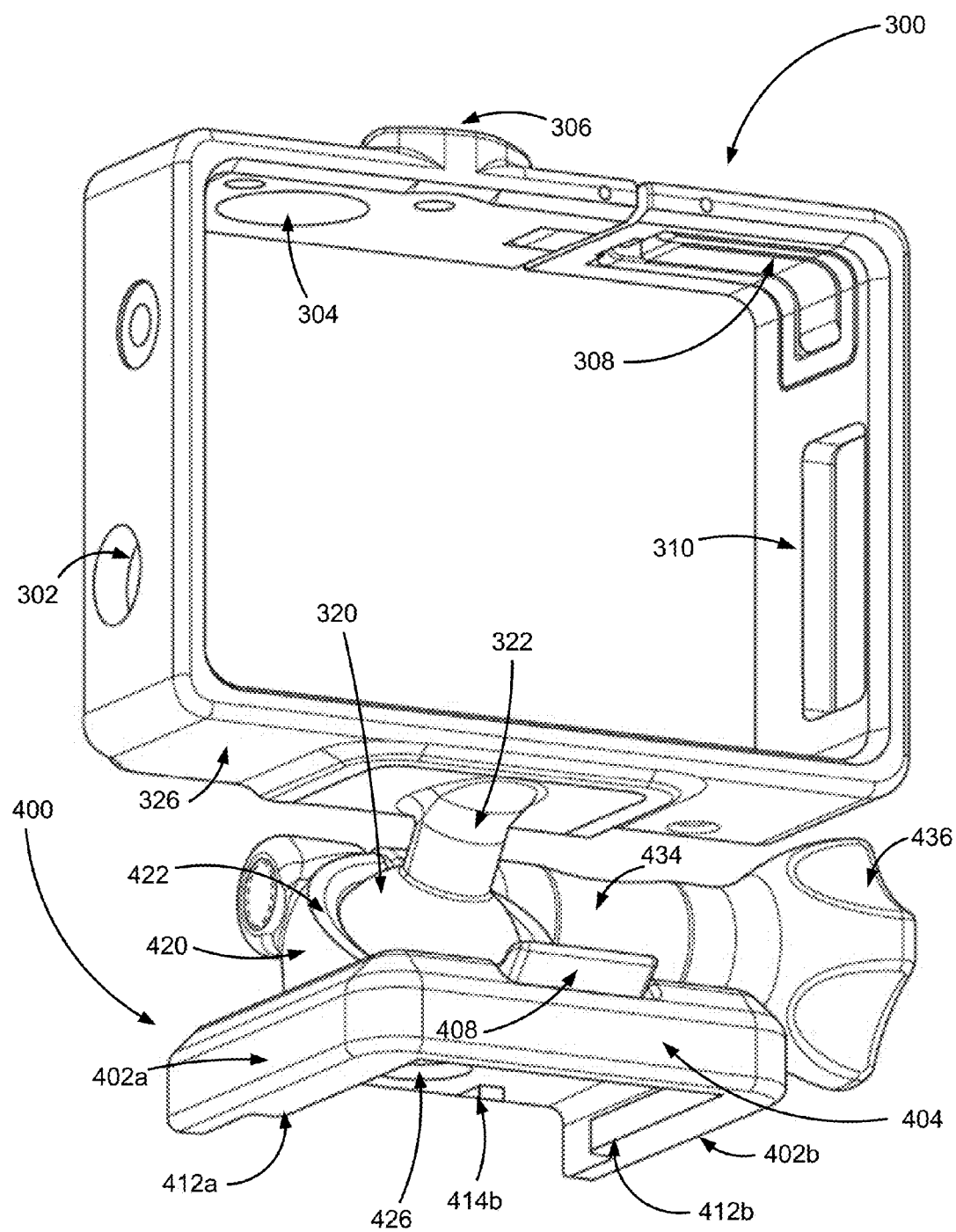
FIGS. 4a through 4e illustrate assembled views of a camera mount with a ball-and-socket joint, according to one embodiment.
Figure 4B:
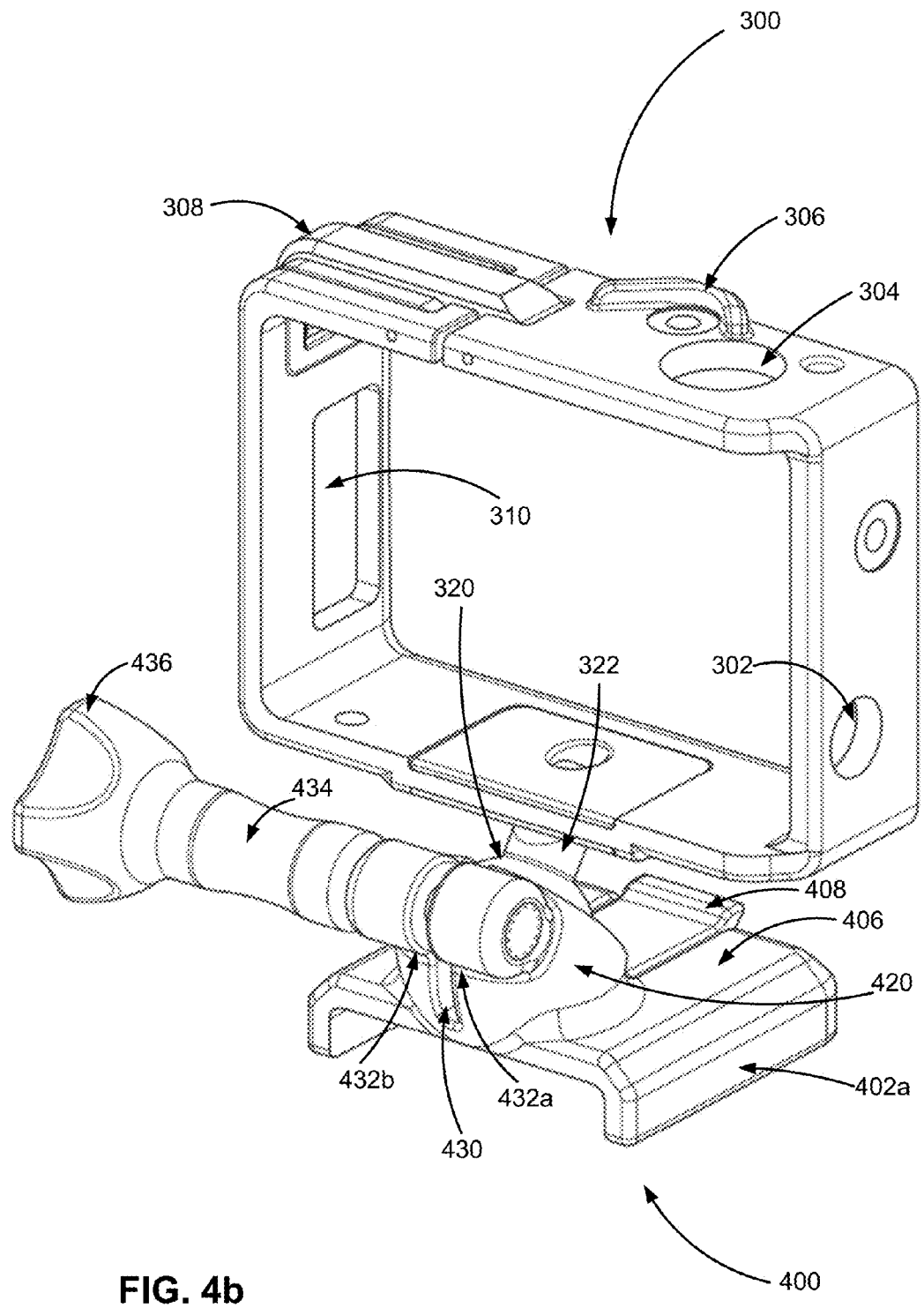
Figure 4C:
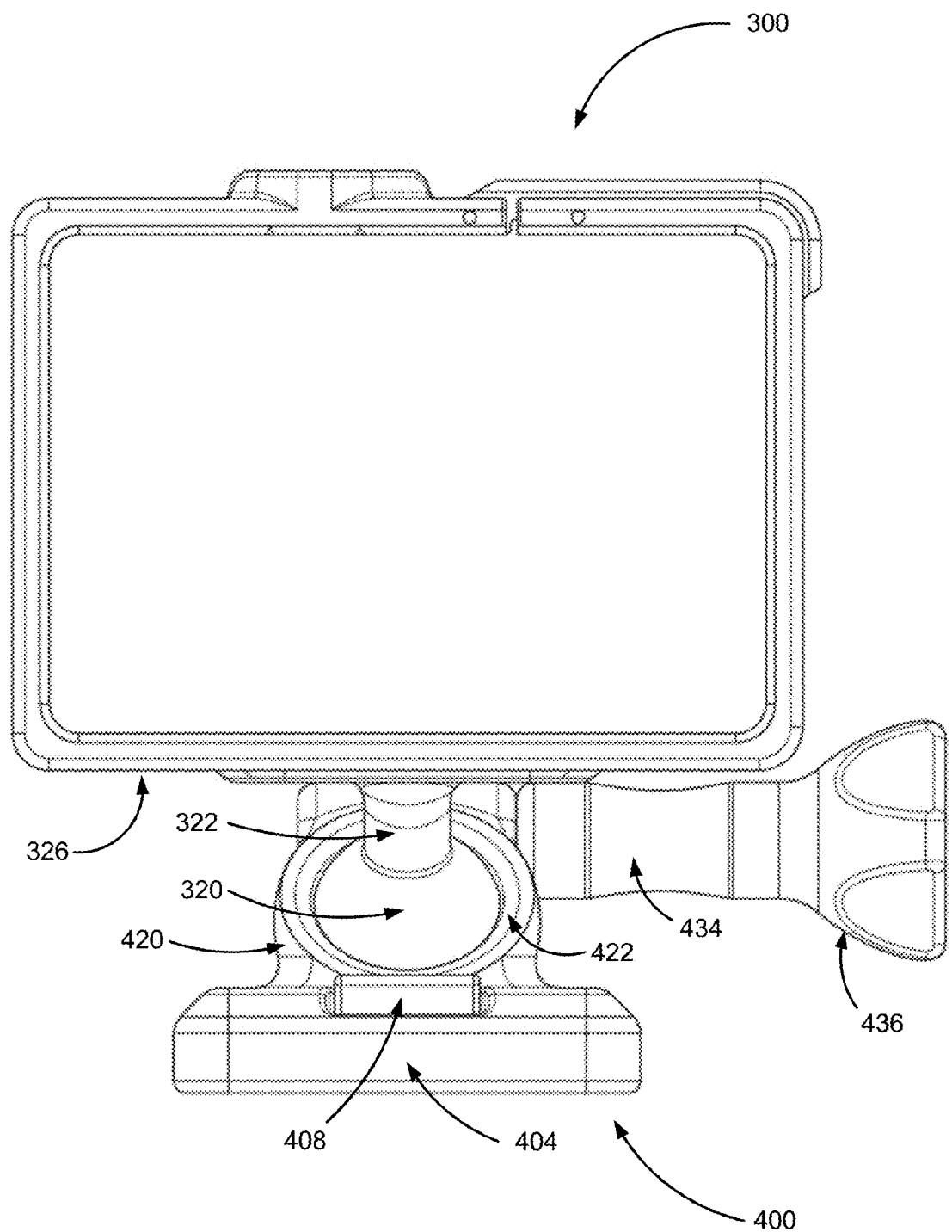
Figure 4D:
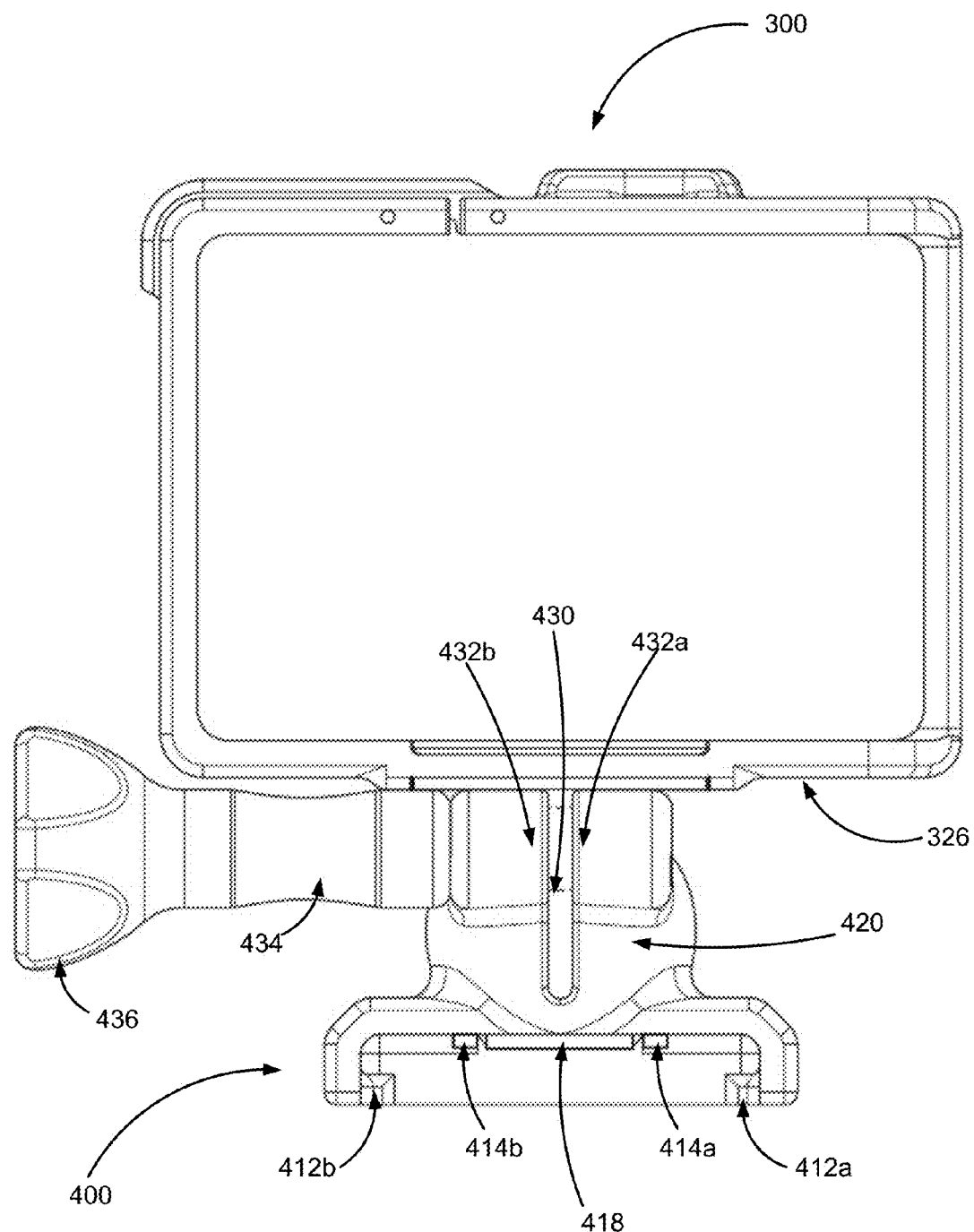
Figure 4E:
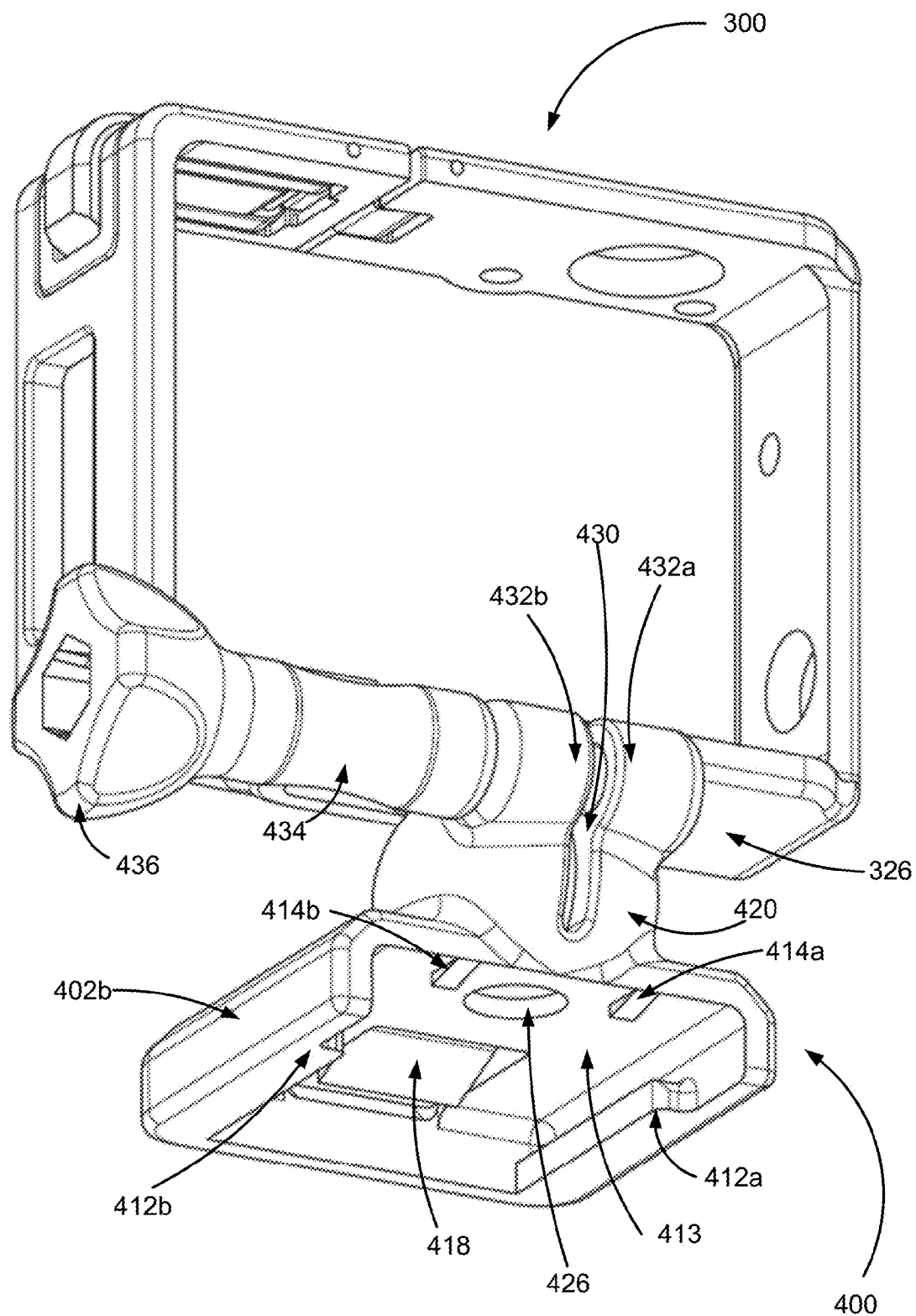

FIGS. 3a and 3b illustrate exploded views of a camera mount with a ball-and-socket joint, according to one embodiment. An upper mount component 300 is configured to partially enclose a camera 200. In some embodiments, the upper mount component has four sides: a top side, a bottom side, a right side, and a left side. In other embodiments, the upper mount component 300 has six sides and fully encloses the camera 200 (for example, similarly to the camera mount of FIGS. 1a and 1b).

The upper mount component 300 has a bottom surface 326 from which a protrusion 322 extends. The protrusion 322 includes a ball 320, and is securely or removably coupled to the bottom surface 326 of the upper mount component 300, for instance with a screw 324 or other securing mechanism. In the embodiments of FIGS. 3a and 3b, the protrusion 322 extends downward and backward relative to the bottom surface 326, though in other embodiments, the protrusion can extend straight downward or any other suitable angle relative to the bottom surface. The sides of the upper mount component 300 can include various cutouts that accommodate features, input/output mechanisms, user interaction mechanisms, or other structures of the camera 200. For example, these could include openings 302 and 310, shutter release button 304, and the like. The upper mount component 300 can also include a latch 308 configured to cause portions of the upper mount component to flex apart in an open configuration (allowing for the insertion or removal of a camera from the upper mount component), or to cause the portions of the upper mount component to securely abut in a closed configuration (allowing for the securing of a camera within the upper mount component).

In accordance with the embodiment shown in FIGS. 3a and 3b, the camera mount also includes a lower mount component 400. The lower mount component 400 has a top surface 406, on which a socket 420 is positioned. The socket 420 includes a top ring surface 422 and an inside surface 424. In some embodiments, the inside surface 424 is semispherical or partially spherical in shape, and can include cut-outs or holes removed from the inside surface as described herein. In some embodiments, the top ring surface 422 of the socket 420 can be positioned at an angle relative to the top surface 406 of the lower mount component 400, for instance an angle between 0 and 90 degrees. In some embodiments, the angle of the top ring surface 422 relative to the top surface 406 of the lower mount component 400 is substantially the same as or is complementary to the angle of the protrusion 322 relative to the bottom surface 326 of the upper mount component 300. For instance, the top ring surface 422 can be positioned at a 35 degree angle relative to the surface 406, and the protrusion 322 can be protrude at a 55 degree angle from the surface 326.

The ball 320 of the upper mount component is configured for insertion into the socket 420. In some embodiments, the ball 320 can be inserted into or removed from the socket 420 when the socket is configured in an open configuration, and can be secured within the socket 420 when the socket is configured in a closed configuration. In some embodiments, the coefficient of static friction between the outer surface of the ball 320 and the inside surface 424 of the socket 420 is large enough to prevent the movement of the upper mount component 300 relative to the lower mount component 400 when the socket is configured in a closed configuration. In some embodiments, the coefficient of static friction between the outer surface of the ball 320 and the inside surface 424 of the socket 420 is large enough to prevent the movement of the upper mount component 300 relative to the lower mount component 400 when the mount is exposed to wind or other small external forces, but is small enough to allow for a user to manually rotate upper mount component relative to the lower mount component, for instance by exerting force on the upper mount component. In such embodiments, the moment arm resulting from the exertion of force on the upper mount component is great enough to overcome the friction force between the ball 320 and the inside surface 424, allowing for manual movement by a user, but not from wind, water, or other forces.

In some embodiments, the upper mount component 300 can rotate 360 degrees relative to the lower mount component 400 within the horizontal plane defined by the surface 406. In such embodiments, the surface 326 remains substantially parallel to the surface 406. The upper mount component 300 can also pivot within one or more vertical planes relative to the lower mount component 400. In such embodiments, the angle between the surface 326 and the surface 406 changes. For example, the upper mount component 300 can be pivoted up to 90 degrees or more forward relative to the lower mount component 400. In one embodiment, the upper mount component 300 is pivoted forward such that a front face of the upper mount component is substantially parallel with the surface 406. Similarly, the upper mount component 300 can be pivoted up to 60 degrees or more backwards relative to the lower mount component 400. Likewise, the upper mount component 300 can be pivoted up to 60 degrees or more to the left or to the right relative to the lower mount component 400. It should be emphasized that the upper mount component can be both rotated within the horizontal plane defined by the surface 406 and pivoted within one or more vertical planes relative to the lower mount component 300. For example, the upper mount component 400 can be rotated 180 degrees horizontally such that a front face of the upper mount component faces towards a rear side of the lower mount component 300, and pivoted 90 degrees towards a front side 404 of the lower mount component, causing the front face of the upper mount component to face upwards, in a direction substantially perpendicular to the surface 406.

The ability of the upper mount component 300 to rotate and pivot relative to the lower mount component 400 beneficially allows a camera secured within the upper mount component to capture images and videos from a wide variety of perspectives. For instance, a camera within the upper mount component 300 can be adjusted to capture image and video in any combination of a 360 degree horizontal rotation and a 90 degree or more pivot towards a front side 404 of the lower mount component 400, a 60 degree or more pivot towards a rear of the lower mount component, a 60 degree or more pivot towards a left side 402b of the lower mount component, or a 60 degree or more pivot towards a right side 402a of the lower mount component. It should be noted that as used herein, the "front" or "front side" of the lower mount component 400 refers to the side of the lower mount component towards which the top ring surface 422 is angled, and the "rear" or "rear side" of the lower mount component refers to the side of the lower mount component away from which the top ring surface is angled.

In various embodiments, the inside surface 424 includes a hole 426 at the bottom of the inside surface to accommodate the curvature of the ball 320 when the ball 320 is inserted within the socket 420, beneficially allowing the upper mount component 300 to rotate and pivot within the socket 420 without requiring a deeper socket.

The socket 420 can include a split 430, which extends from the top ring surface 422 down through a portion of the inside surface 424 (for instance, through 40% or more of the inside surface 424). On either side of the split 430 and extending outward from the top ring surface 422 are screwhole protrusions 432a and 432b. The screwhole protrusions 432 align such that a screw 434 with a handle 436 can be inserted through the screwhole protrusions. When the handle 436 is rotated in a tightening direction, the screw 434 tightens and causes the screwhole protrusions 432a and 432b to flexibly compress towards each other, lessening the width of the split 430. This, in turn, decreases the surface area of the inner surface 424 of the socket 420. When the ball 320 is inserted into the socket 420, the decreased surface area of the inner surface 424 increases the radially inward normal force applied by the inner surface 424 on the ball 320, increasing the friction force exerted on the ball, and securing the ball within the socket. Such a configuration is referred to herein as the "closed configuration". As described above, in the closed configuration, the upper mount component 300 cannot rotate or pivot relative to the lower mount component 400 without manual force exerted upon the upper mount component by a user. FIGS. 4a-e illustrate assembled views of the mount with the ball-and-socket joint as described herein. It should be noted that the socket 420 encompasses 50% or more of the surface of the ball 320 when the ball is secured within the socket. In the closed configuration, as the width of the split 430 is decreased, the circumference of the top ring surface 422 can be decreased to less than the circumference of the ball 320. As the ball is at least 50% encompassed by the socket 420, such a configuration prevents the ball 320 from being removed from the socket 420.

When the handle 436 is rotated in a loosening direction, the screw 434 loosens, causing the screwhole protrusions to separate, and increasing the width of the split 430. This, in turn, increases the surface area of the inner surface 424 of the socket 420, decreasing the friction force exerted upon the ball 320 by the inner surface, allowing the upper mount component 300 to be rotated or pivoted relative to the lower mount component 400 more easily. Such a configuration is referred to herein as the "open configuration". In the open configuration, as the width of the split 430 is increased, the circumference of the top ring surface 422 can be increased to greater than the circumference of the ball 320, allowing for the insertion of the ball into or removal of the ball from the socket 420.

Figure 5:
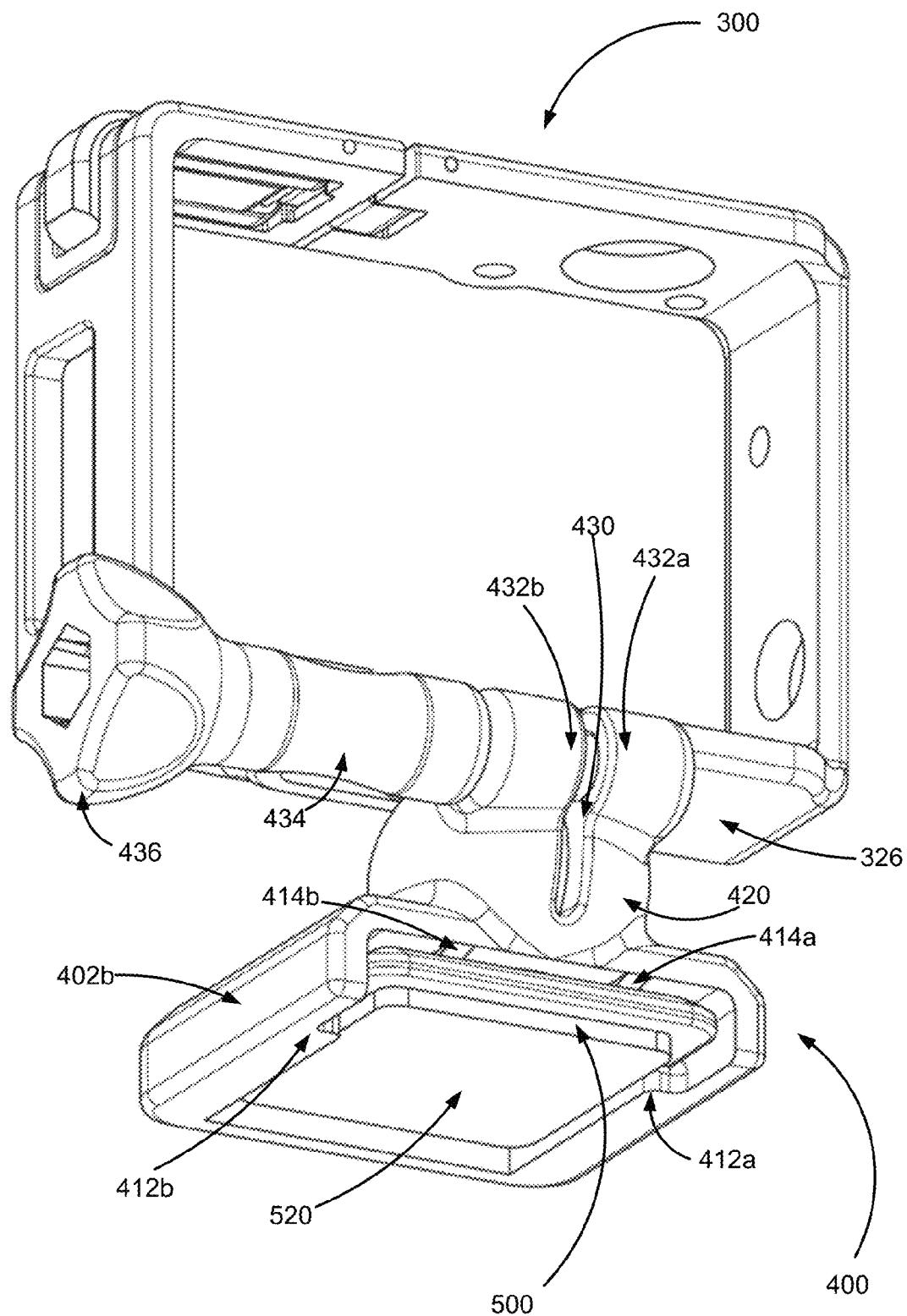
FIG. 5 illustrates a camera mount with a ball-and-socket joint and a mount base, according to one embodiment.

The lower mount component 400 couples to a base mount component 500, as shown in FIG. 5. A bottom side of the lower mount component 400 can include ledges 412a and 412b protruding inward from a bottom of the sides 402 of the lower mount component, creating a space between a top side of the ledges 412 and a bottom surface 413 of the lower mount component. The base mount component 500 can be inserted into the space between the ledges 412 and the bottom surface 413. The bottom surface 413 includes lips 414a and 414b protruding downward from the bottom surface. The lips 414 can be triangular in shape such that a first face protrudes diagonally downward from the bottom surface 413 and facing outward from the lower mount component 400, and such that a second face protrudes perpendicularly downward from the bottom surface. As described below, the lips 414 are configured to catch on and secure the base mount component 500.

The top surface 406 of the lower mount component 400 includes a tab 408 with a lip 418 configured to exert downward force on the base mount component 500 in a released configuration when the base mount component is inserted into the lower mount component, causing the base mount component to exert reciprocal force on a top surface of the ledges 412. The lip 418 is configured to catch and abut a reciprocal ledge on a top surface of the base mount component 500 when the tab 408 is in the released configuration, securing the base mount component to the lower mount component 400. The tab 408 can be lifted by a user in a lifted configuration such that the lip 418 does not exert downward force on the base mount component 500, allowing for the removal of the base mount component from the lower mount component 400.

Figure 6A:
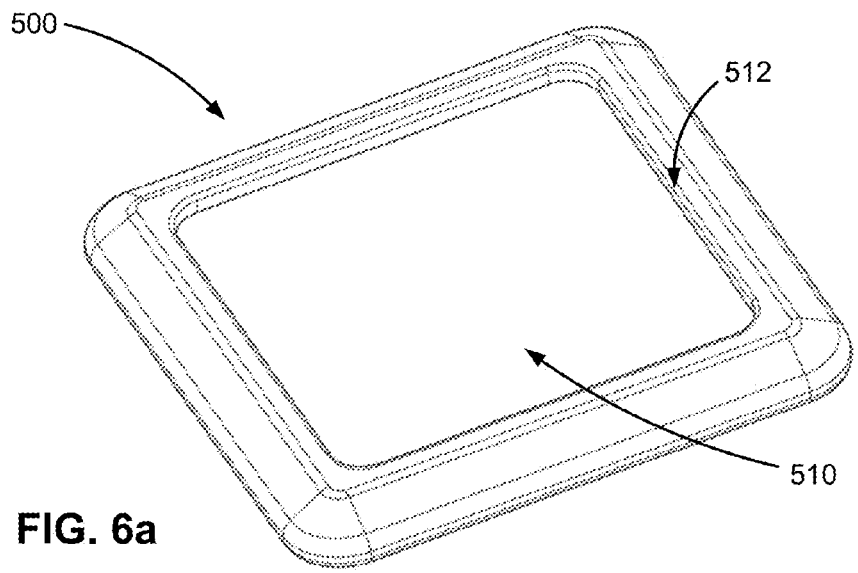
FIGS. 6a through 6c illustrate views of a camera mount base, according to one embodiment.
Figure 6B:
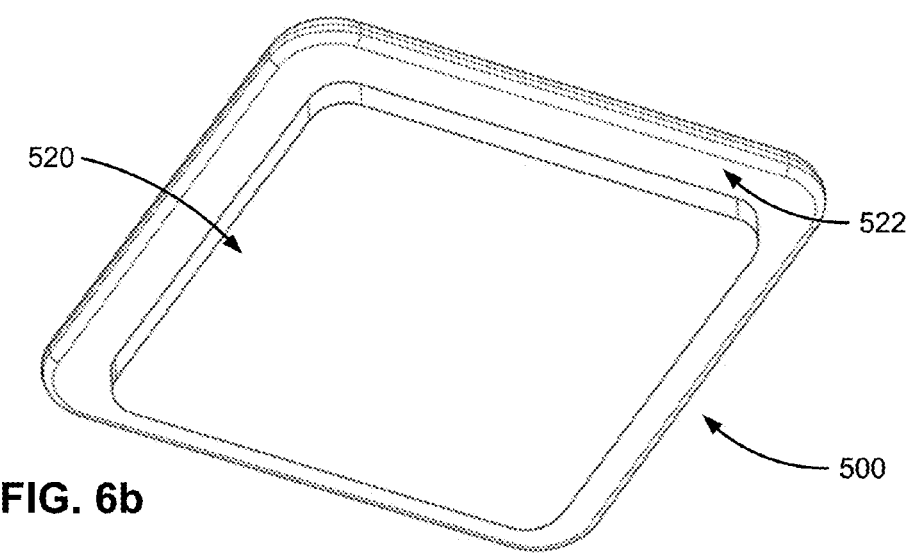
Figure 6C:
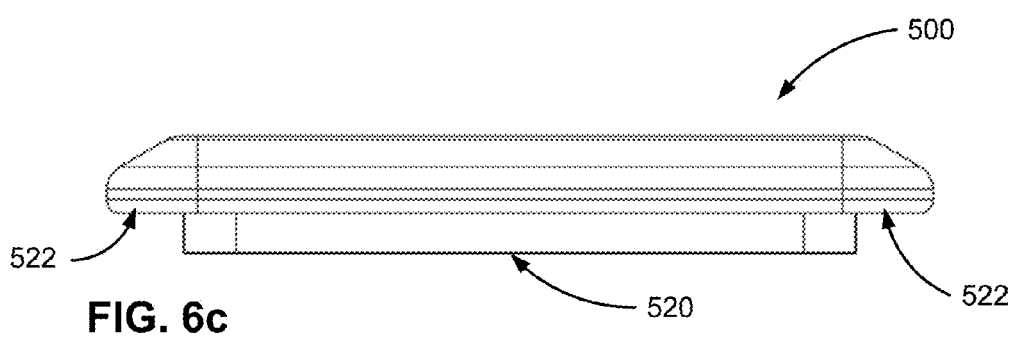

The base mount component 500 is illustrated from various perspectives in FIGS. 6a-c. The base mount component 500 has a top surface 510 and a bottom surface 520. The top surface 510 has a ridge 512 around its perimeter, extending perpendicularly upward from the top surface and diagonally upward from the outside perimeter of the ridge. When the base mount component 500 is completely inserted into the lower mount component 400, the ridge 512 catches and abuts the lip 418, securing the base mount component within the lower mount component. Similarly, the lips 414a and 414b of the lower mount component 400 exert a downward force onto the ridge 512 of the base mount component 500 when the base mount component is inserted into the lower mount component, further securing the base mount component within the lower mount component. The bottom surface 520 of the base mount component 500 protrudes downward and outward from the ledge 522. The ledge 522 can abut the top sides of the ledges 412 when the base mount component is inserted into the lower mount component 400.

The bottom surface 520 can be coupled to a surface to secure the base mount component in place. For instance, the bottom surface can be coupled to a surface adhesively, mechanically, with suction, with an attachment device (such as a screw), or using any other suitable mechanism or means. In some embodiments, the bottom surface 520 can be removably or temporarily coupled to a surface, allowing a user to remove the base mount component 500 from a surface and to re-couple the base mount component to another surface. The base mount component 500 can couple to any suitable surface, such as a sports board, a wall, a ledge, a vehicle, a user, and the like.

The base mount component 500 is substantially square in shape, such that base mount component is symmetric across the width and height of the base mount component. Such a configuration beneficially allows for the insertion of the base mount component 500 into the lower mount component 400 in any of four directions, allowing a user to position the lower mount component such that the lower mount component is facing any of the four directions. It should be noted that although reference is made herein to the insertion and removal of the base mount component 500 into/from the lower mount component 400, generally the base mount component will be secured to a surface, and the lower mount component will be inserted over/removed from the base mount component. When the upper mount component is securely coupled to the lower mount component 400, and the coupled mount components are secured onto the base mount component, a user can capture images and video with a camera secured within the upper mount component, at any of a number of angles and orientations as described herein. When the user wishes the remove the coupled mount components from the base mount component 500, the user can simply lift upwards on the tab 408 and slide the coupled mount components off of the base mount component.

Backwards Compatibility

Figure 7A:
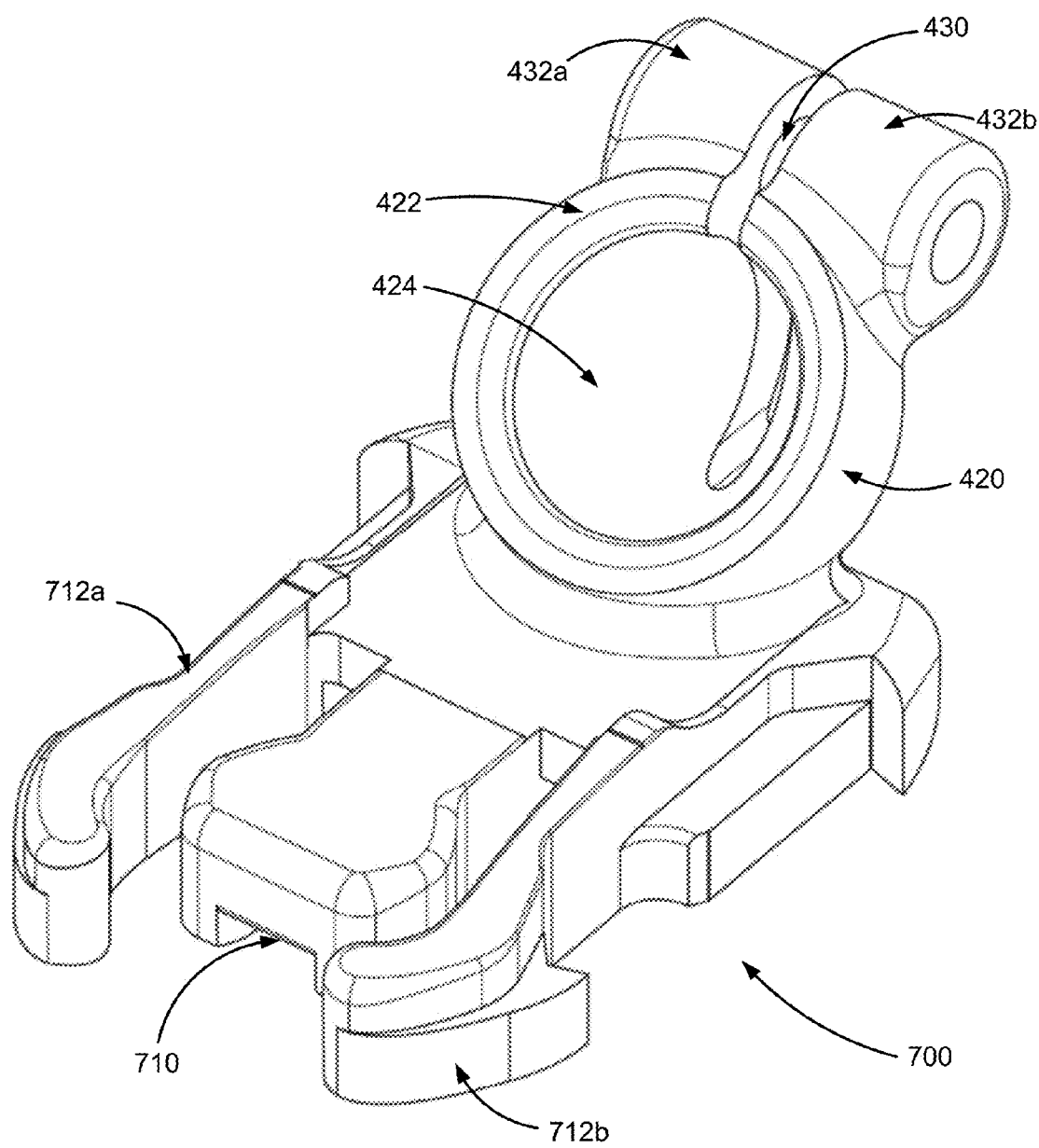
FIGS. 7a and 7b illustrate views of an adapter for a camera mount with a ball-and-socket joint, according to one embodiment.
Figure 7B:
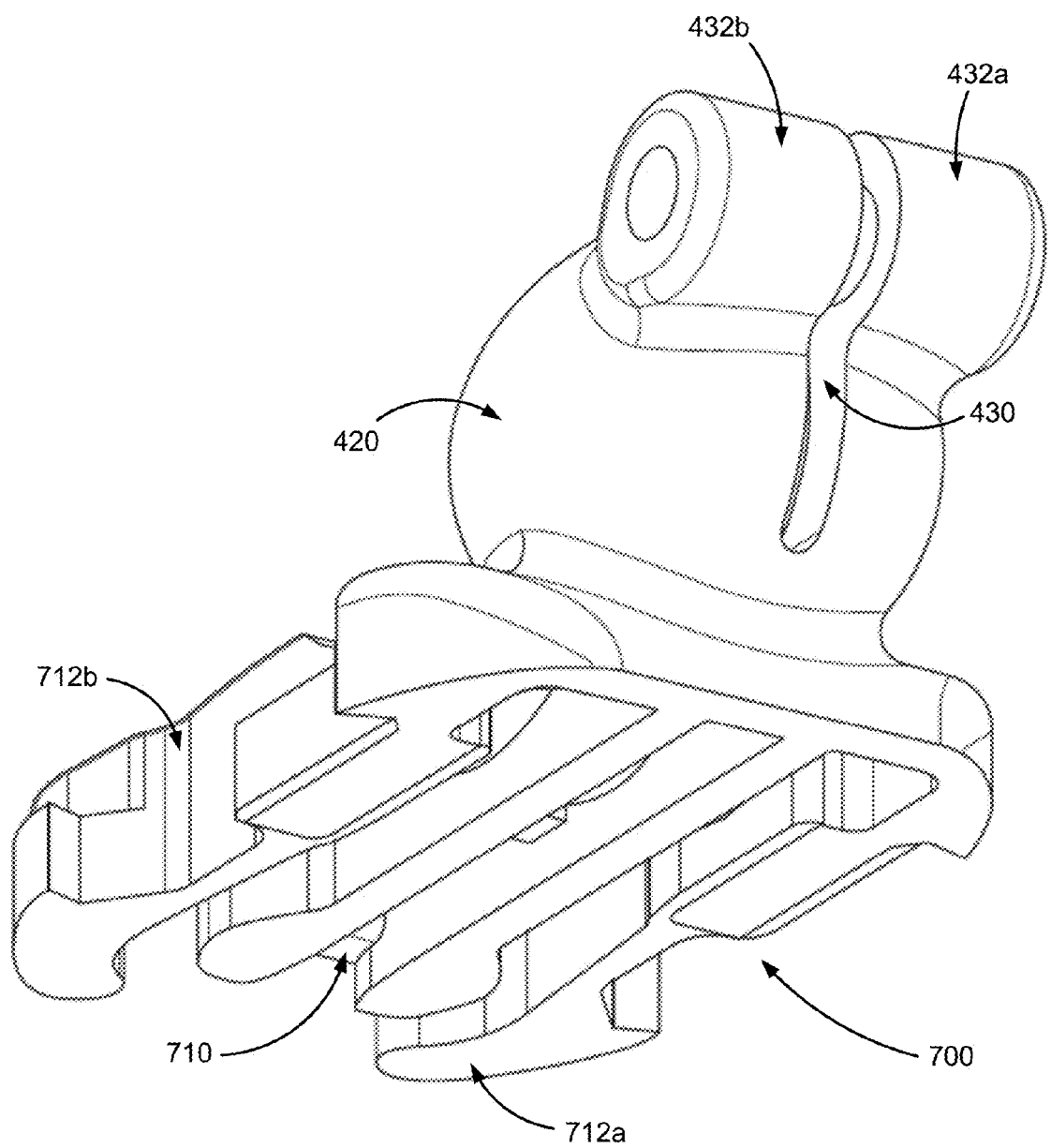
Figure 8A:
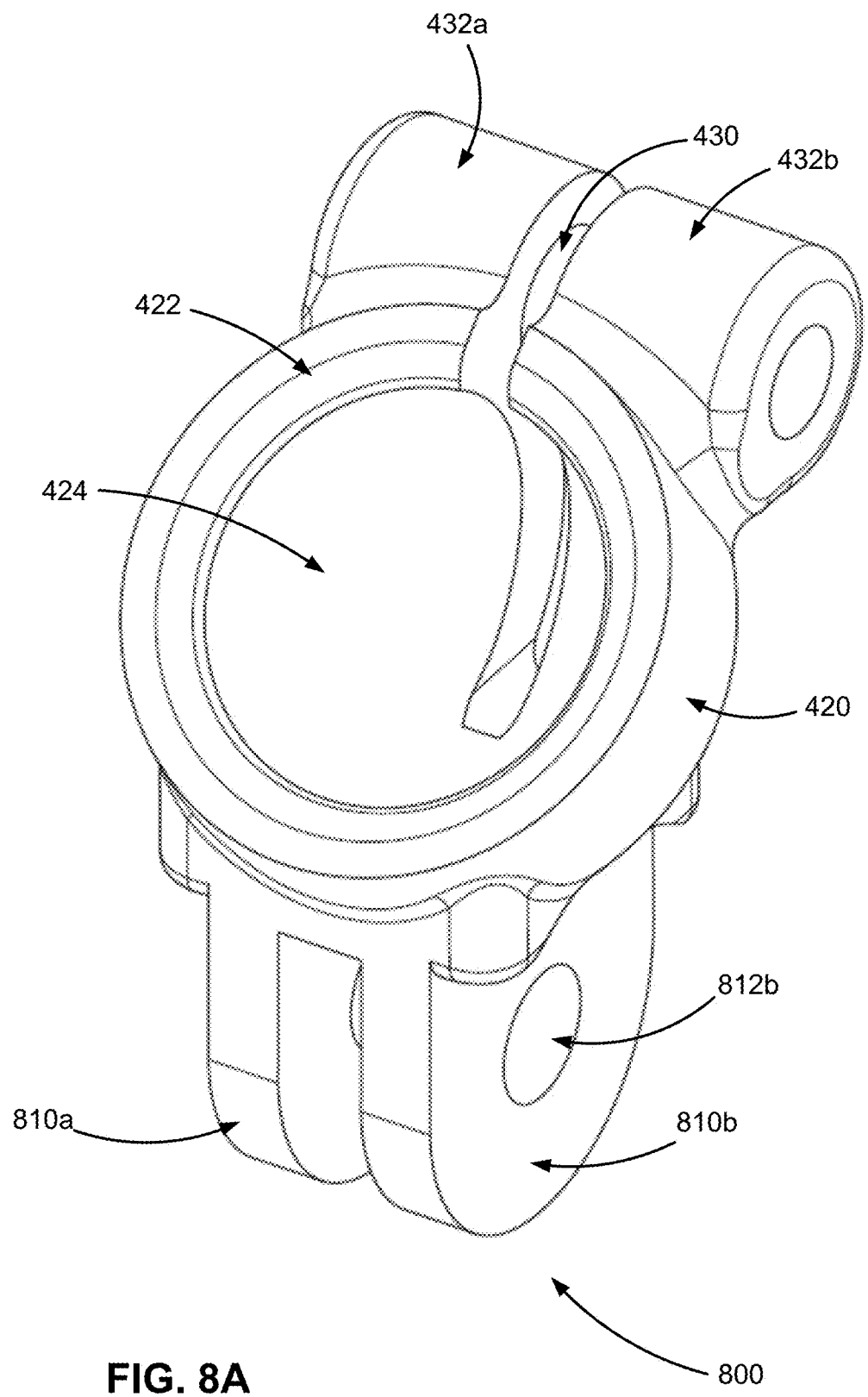
FIGS. 8a and 8b illustrate views of an adapter for a camera mount with a ball-and-socket joint, according to another embodiment.
Figure 8B:
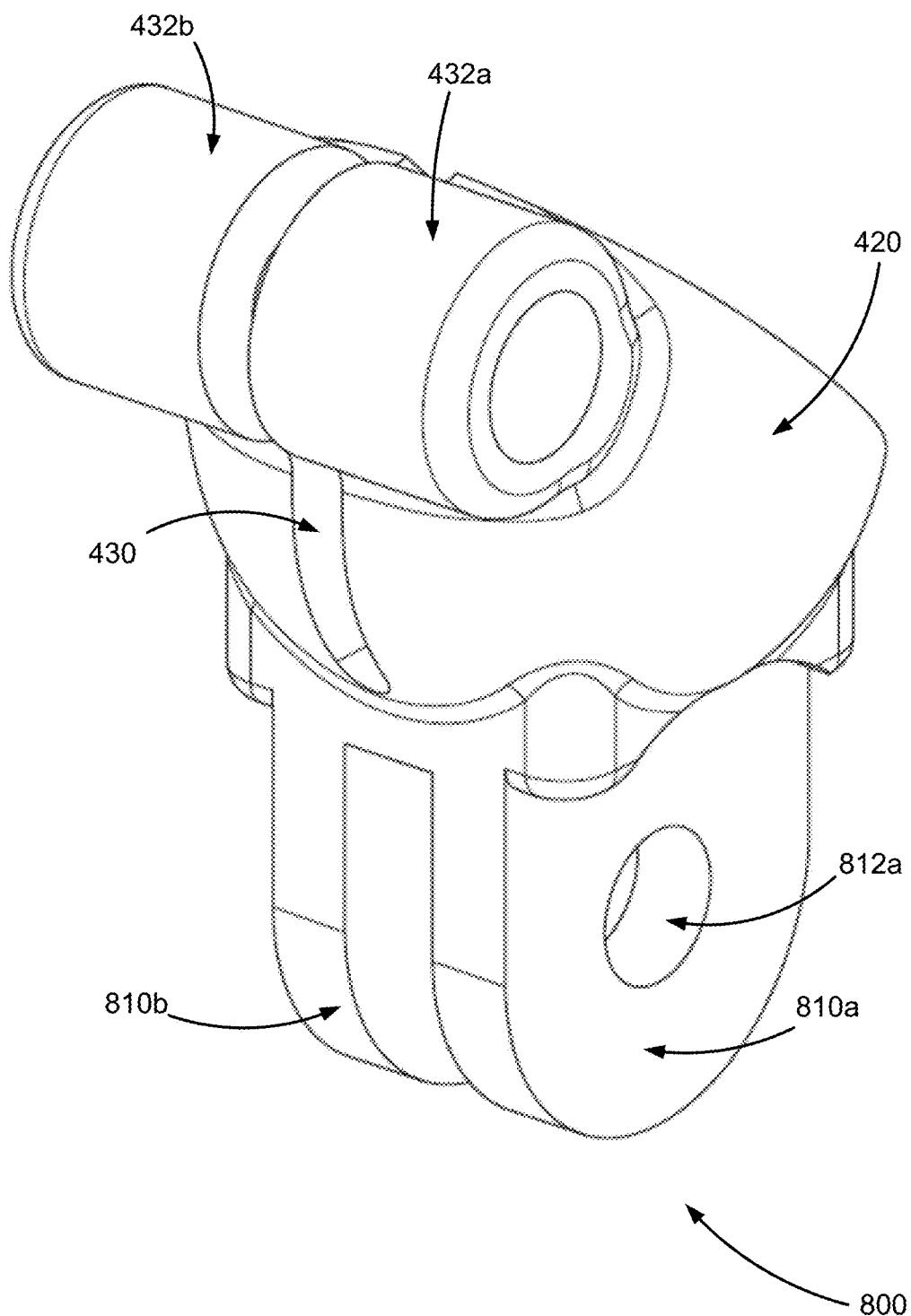

To make the ball-and-socket joint system compatible with previous camera mounting systems (such as the mounting systems illustrated in FIGS. 1a and 1b), adapters 700 and 800 shown in FIGS. 7 and 8 have been created. Both adapters 700 and 800 couple to the upper mount 300 in the way described above but include an alternative mechanism for coupling with a base mount that is different from base mount 500. Adapter 700 is configured to connect, via the groove 710 to a planar base mount that can accommodate the prongs 712a and 712b. Adapter 800 is configured to couple with a base mount that comprises a plurality of protrusions 810a and 810b with holes 812a and 812b that align such that a pin can be inserted through the holes in both the base mount and the adapter 800.

Extension Arm Example

Figure 9A:
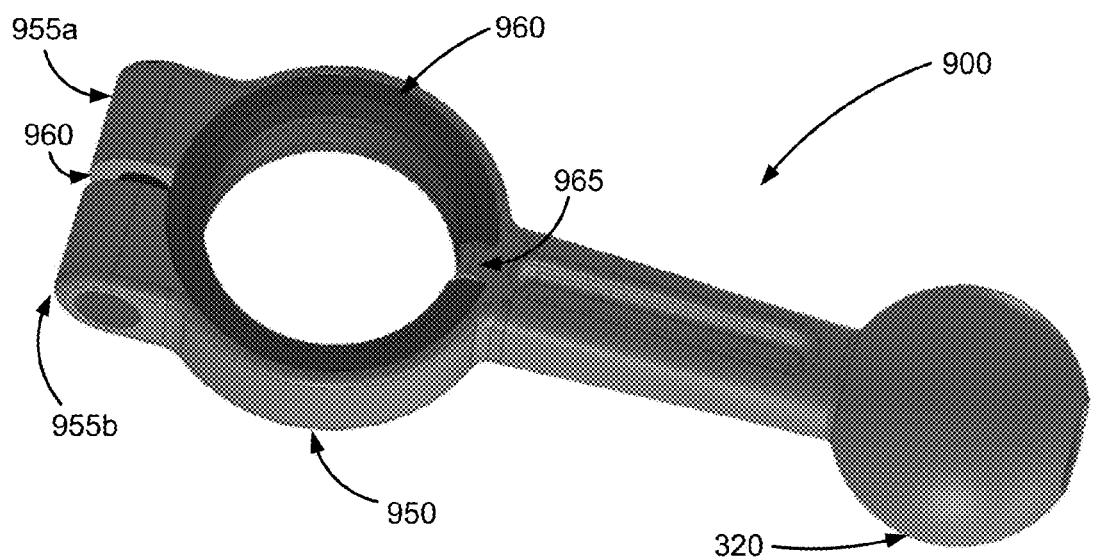
FIGS. 9a and 9b illustrate views of an extension arm for a camera mount with a ball-and-socket joint, according to one embodiment.
Figure 9B:
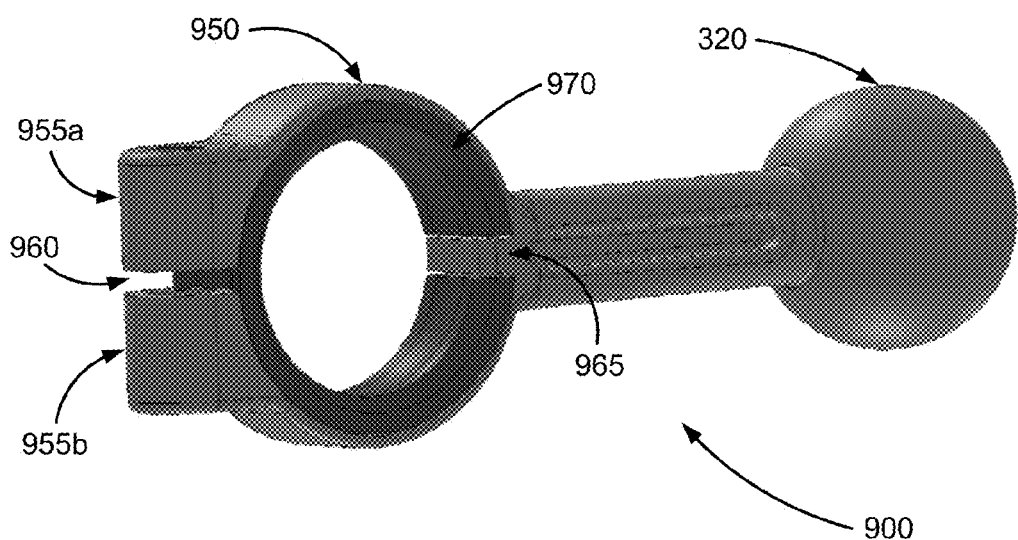

FIG. 9 illustrates an extension arm 900 that can be used to further extend the range of the camera mount system described herein. The extension arm 900 includes a ball protrusion 320 that couples to the lower mount component 400 as described above with regards to the ball 320 of FIGS. 3-5, and includes a modified socket 950 that couples to the upper mount component 300. The modified socket 950 is configured to securely enclose around a circumference of the ball 320, as well as a portion on either side of the enclosed circumference of the ball 320. The modified socket 950 includes a split 960. On either side of the split 960 are screwhole protrusions 955a and 955b that align such that a screw can be inserted through the screwhole protrusions. The screw can then be tightened to flexibly compress the screwhole protrusions 955a and 955b towards each other and lessen the width of the split 960, decreasing the circumference of the inner surface of the modified socket 950 and increasing the radially inward normal force exerted on the ball 320 by the modified socket 950, securing the ball 320 within the modified socket 950. In one embodiment, a socket ring 960 including a semi-spherical profile is included within the modified socket 950 in order to better match the contours of the ball 320. The socket ring 960 can also include a split 965 that decreases in width when a screw is inserted and tightened, causing the screwhole protrusions 955a and 955b flexibly compress towards each other. In another embodiment, the inner surface of the modified socket 950 includes a semi-spherical profile to match the contours of the ball 320.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera mount as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A mounting system for attaching a camera to a surface, comprising:
   an upper mount component structured to at least partially enclose a camera, the upper mount component having a bottom surface including a protrusion extending from the bottom surface at a fixed, non-perpendicular angle relative to the bottom surface, the protrusion comprising a ball component; and
   a lower mount component having a top surface, the top surface comprising a reciprocal socket component configured to rotationally couple with the ball component of the upper mount component, the socket component tilted relative to the top surface, wherein portions of the socket component are capable of flexibly compressing together in a closed configuration such that the ball component is secured within the socket component.

2. The mounting system of claim 1, wherein the socket component comprises a split within an inside surface of the socket component from a top side of the socket component.

3. The mounting system of claim 2, wherein the split in the socket component of the lower mount component extends no more than halfway down a side of the socket component.

4. The mounting system of claim 2, wherein the socket component comprises a screw hole protrusion on an outer surface of the socket component on either side of the split, the screw hole protrusions configured to align and receive a screw.

5. The mounting system of claim 1, wherein the socket component is set at an angle greater than 0 degrees and less than 90 degrees relative to the top surface of the lower mount component.

6. The mounting system of claim 1, wherein an inside surface of the socket component comprises a hole to accommodate the curvature of the ball component when inserted into the socket component.

7. The mounting system of claim 1, wherein the socket component of the lower mount component covers more than 50% of a surface area of the ball component of the upper mount component.

8. The mounting system of claim 1, wherein the upper mount component is configured to rotate 360 degrees relative to the lower mount component within a horizontal plane defined by the top surface of the lower mount component.

9. A mounting system for attaching a camera to a surface, comprising:
an upper mount component having a bottom surface including a protrusion extending from the bottom surface at a fixed, non-perpendicular angle relative to the bottom surface, the protrusion comprising a ball component;
a lower mount component having a top surface and a bottom surface, the top surface comprising a socket component configured to rotationally couple with the ball component that extends from the upper mount component, the socket component tilted relative to the top surface, the bottom surface of the lower mount component comprising a first coupling mechanism configured to couple to the surface.

10. The mounting system of claim 9, wherein the socket component is set at an angle greater than 0 degrees and less than 90 degrees relative to the top surface of the lower mount component.

11. The mounting system of claim 9, wherein the socket component comprises a split within an inside surface of the socket component from a top side of the socket component, such that portions of the socket component are capable of flexibly compressing together in a closed configuration such that the ball component is secured within the socket component.

12. The mounting system of claim 11, wherein the split in the socket component of the lower mount component extends no more than halfway down a side of the socket component.

13. The mounting system of claim 11, wherein the socket component comprises a screw hole protrusion on an outer surface of the socket component on either side of the split, the screw hole protrusions configured to align and receive a screw.

14. The mounting system of claim 9, wherein an inside surface of the socket component is partially spherical.

15. A mounting system for attaching a camera to a surface, comprising:
an upper mount component having a bottom surface including a protrusion extending from the bottom surface at a fixed, non-perpendicular angle relative to the bottom surface, the protrusion comprising a ball component;
a lower mount component having a top surface and a bottom surface, the top surface comprising a socket component configured to rotationally couple with the ball component that extends from the upper mount component, the socket component tilted relative to the top surface, wherein portions of the socket component are capable of flexibly compressing together in a closed configuration such that the ball component is secured within the socket component, the bottom surface of the lower mount component comprising a first coupling mechanism; and
a base component comprising a second coupling mechanism configured to releasably couple to the first coupling mechanism.

16. The mounting system of claim 15, wherein the bottom surface of the lower mount component comprises two or more ledges protruding inward from a bottom of respective sides of the lower mount component, creating a space between a top side of the ledges and the bottom surface of the lower mount component.

17. The mounting system of claim 16, wherein the base mount component is insertable into the space between the top side of the ledges and the bottom surface.

18. The mounting system of claim 17, wherein the top surface of the lower mount component comprises a protrusion that exerts a downward force on the base mount component when inserted into the lower mount component, thereby securing the base mount component within the space.

19. The mounting system of claim 18, wherein the protrusion can be flexibly moved upward and away from the base mount component, thereby allowing for the removal of the base mount component from the space.

20. The mounting system of claim 15, wherein the base component is symmetrical across two axes and can couple with the lower mount component in a plurality of orientations.

* * * * *